Oct. 25, 1955 H. H. SCHNECKLOTH 2,721,897

CARRIER WAVE COMMUNICATION SYSTEM

Filed Jan. 13, 1951 3 Sheets-Sheet 1

INVENTOR
H. H. SCHNECKLOTH
BY Earl C. Laughlin
ATTORNEY

Oct. 25, 1955 — H. H. SCHNECKLOTH — 2,721,897

CARRIER WAVE COMMUNICATION SYSTEM

Filed Jan. 13, 1951 — 3 Sheets-Sheet 2

INVENTOR
H. H. SCHNECKLOTH
BY *Earl C. Laughlin*
ATTORNEY

Oct. 25, 1955 H. H. SCHNECKLOTH 2,721,897

CARRIER WAVE COMMUNICATION SYSTEM

Filed Jan. 13, 1951 3 Sheets-Sheet 3

INVENTOR
H. H. SCHNECKLOTH
BY Earl C. Laughlin
ATTORNEY 2,721,897

CARRIER WAVE COMMUNICATION SYSTEM

Harry H. Schneckloth, Forest Hills, N. Y., assignor to Bell Telephone Laboratories, Incorporated, New York, N. Y., a corporation of New York Application January 13, 1951, Serial No. 205,865

2 Claims. (Cl. 179—2.5)

The invention relates to communication systems and particularly to carrier wave communication systems.

The invention is specifically applicable to a system employing one or more high frequency carrier channels for supplying two-way telephone service to a number of subscribers over a common transmission medium, for example, a power or other type of transmission line. In such a system, a telephone subscriber associated with any carrier channel may communicate on a party line basis with the telephone subscribers associated with the same carrier channel over the common medium through a common carrier terminal for that channel or with a telephone subscriber associated with another channel on the same medium or with an outside voice frequency telephone network over the common medium through the common carrier terminal or terminals for the carrier channels involved and an associated central switching office for setting up the desired connections.

In prior art systems of this general type, it is known to employ two electric waves of different high frequencies as carriers for both speech and signaling. In such systems, for central office calls, that is, calls involving the central office operator or calls through the central office, transmission over the common medium from a subscriber carrier terminal associated with one carrier channel to the common carrier terminal for that channel will be always on a carrier wave of one of these two frequencies and transmission in the opposite direction on a carrier wave of the other frequency. For reverting or party line calls, that is, calls between subscribers associated with the same carrier channel on the common medium, the transmitting and receiving carrier frequencies of either the calling or called subscriber station will be reversed and the transmitting carrier frequency of the common carrier terminal for that channel will be removed from the common medium in order to prevent signaling interference. In these prior art systems, the reversing of the transmitting and receiving carrier frequencies at a subscriber carrier terminal is produced by equipment under control of manually operable keying means at the calling subscriber station.

Objects of the invention are to improve a carrier communication system of the above-described general two-carrier frequency type from the standpoint of: (1) simplification of operating procedures, particularly in connection with reverting (party line) calls; (2) simplification and reduction in the amount of station equipment with consequent reduction in the cost of the system; (3) prevention of signaling interference with provision of a degree of secrecy, if desired; and (4) more efficient use of available frequency range.

In accordance with the invention, in a two-frequency carrier system of the above-described type, automatic arrangements comprising test and switching relays are provided at each of the subscriber carrier terminals for testing the line or other common transmission medium to determine the presence or absence thereon of one or both carrier frequencies, and, depending on the results of the tests, to cause the station to cut in and operate normally for a central office call; to cut in with transmitting and receiving carrier frequencies reversed for a reverting call; or to lock out so as to prevent signaling interference when a call is in progress, contributed by the local station not involved in the call, and to prevent eavesdropping by the local subscriber.

The automatic arrangements provided for reversing the transmitting and receiving carrier frequencies at each subscriber carrier terminal on reverting calls permit the use of standard subscriber sets and standard procedure on the part of the subscriber in making such calls.

Also, automatic relay arrangements are provided at each common carrier terminal associated with a central office to enable that terminal to distinguish between reverting and non-reverting (central office) calls, these arrangements being selected so as to be applicable to various types of dial offices and to accomplish the desired result without the necessity of making any changes in the associated central office or operation of special keys by the subscribers involved in a call.

A feature of the invention is the physical separation of each subscriber's telephone set from the associated carrier, power supply and control apparatus so as to enable that apparatus to be mounted as a unit on a pole or elsewhere outside of the subscriber's premises and to serve as common equipment for a number of subscriber sets connected thereto by two-conductor wire-line extensions, thus minimizing the amount of subscriber carrier terminal equipment required in practice.

A more complete understanding of the various objects and features of the invention may be obtained from the following detailed description when read in conjunction with the accompanying drawings in which.

Figure 1:
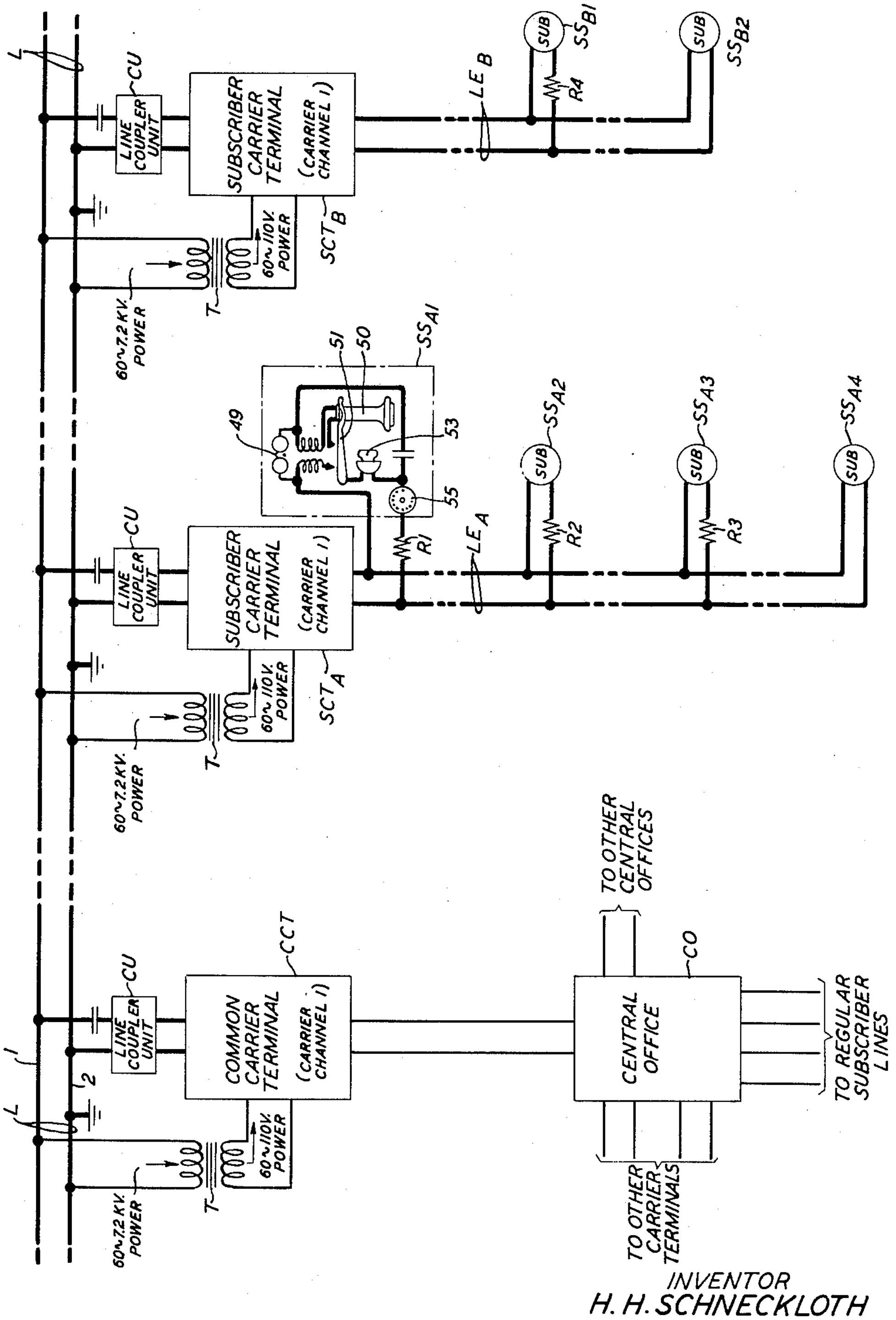
Fig. 1 shows in block schematic form one carrier channel of a multiparty power line carrier telephone system embodying the invention.

The system of the invention shown in Fig. 1 includes the transmission line L primarily employed for transmission of low frequency, high voltage power and which may be adapted for simultaneous use for high frequency carrier telephony in any suitable manner. The line L is shown as a single phase line consisting of one phase conductor 1 and a neutral conductor 2, the latter being grounded at a number of spaced points, for example, at each transmission pole. This type of line is commonly used in rural areas for transmitting high voltage (7.2 kilovolts), low frequency (60 cycles) electric power to a number of electric power consumers. However, the carrier system of the invention to be described may be used with other types of power line, with telephone wire lines or with a transmission medium employing one or more radio links.

Figure 2:
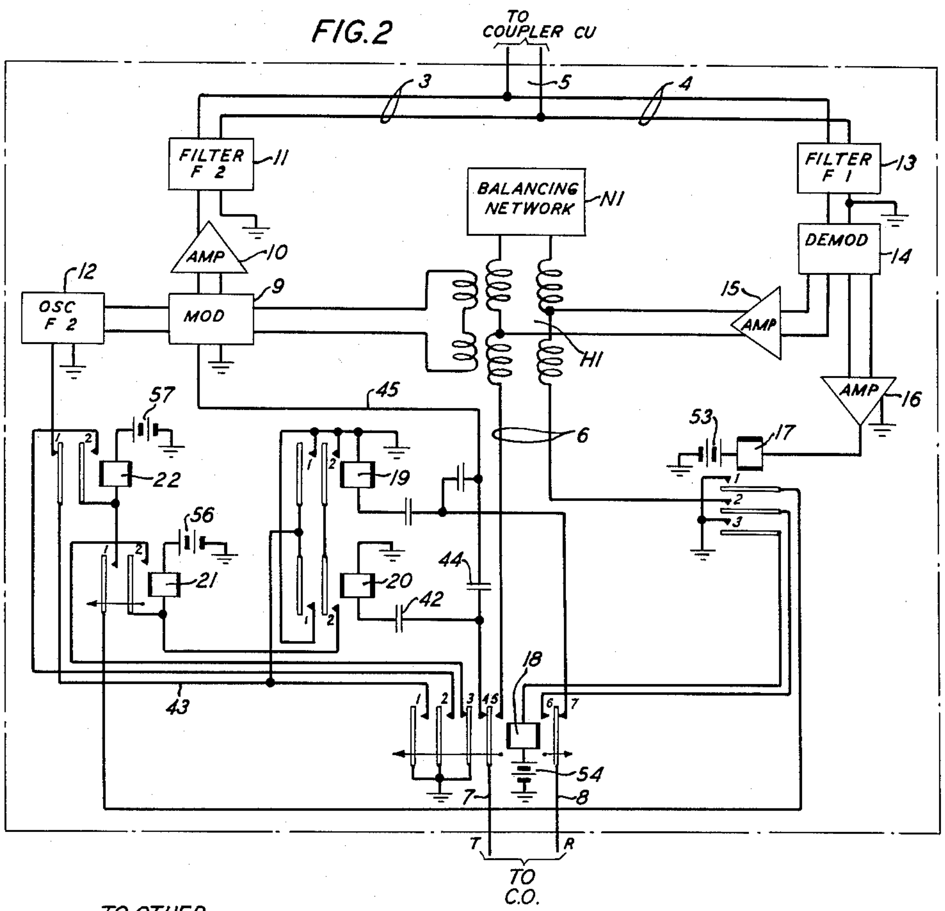
Fig. 2 shows schematically the circuit details of the central office common carrier terminal used in the system of Fig. 1.
Figure 3:
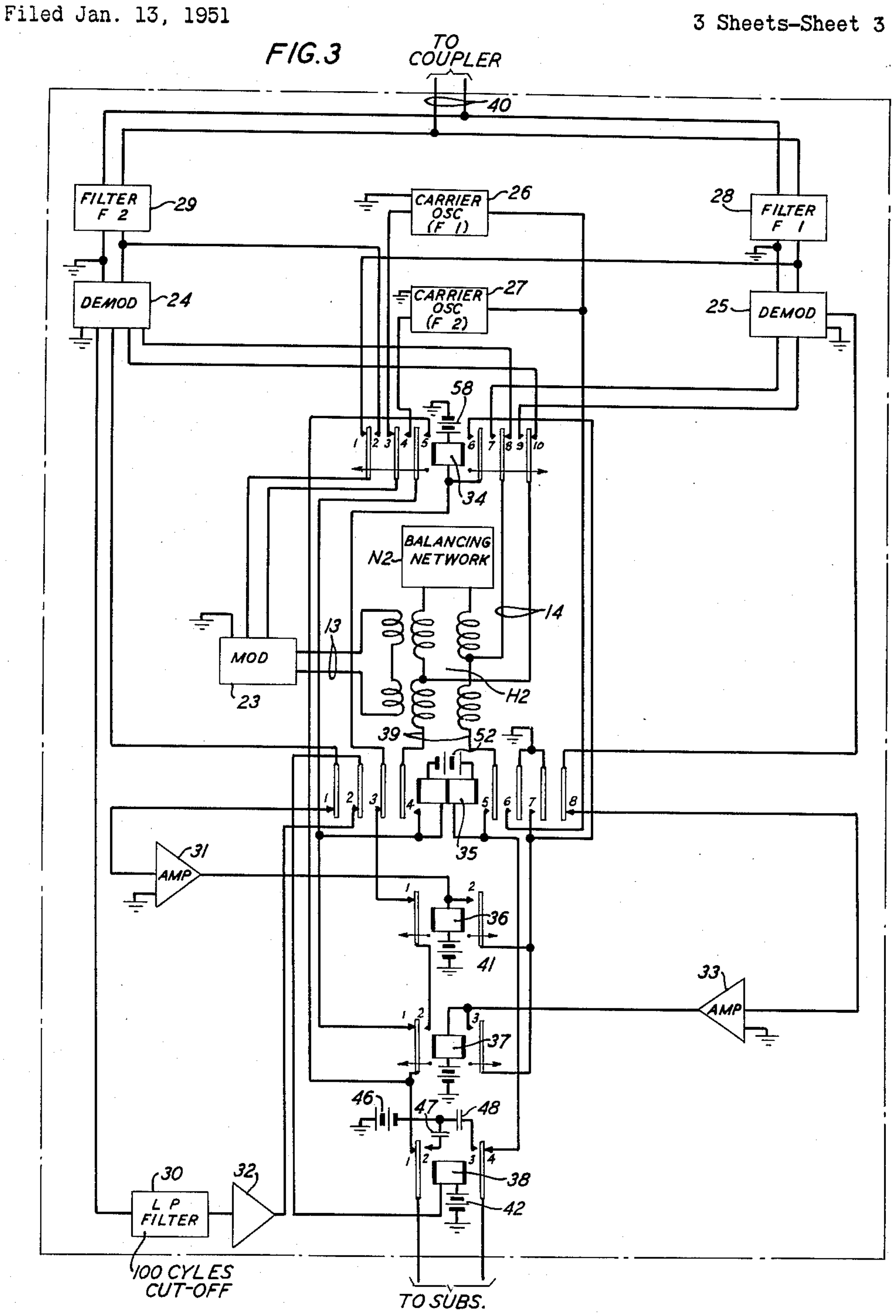
Fig. 3 shows schematically the circuit details of the equipment used at each of the subscriber carrier terminals in the system of Fig. 1.

A plurality of like subscriber carrier terminals $SCT_A$, $SCT_B$ . . ., each having a circuit such as shown in Fig. 3, associated with one carrier channel, to be referred to hereinafter as channel 1, of the system and a common carrier terminal CCT having a circuit such as shown in Fig. 2, individual to that carrier channel are respectively connected through an individual line coupler unit CU in bridging relation with the power line L at different points. A central switching office CO, which may be of any of the well-known automatic or manual types, is connected by individual two-wire circuits to the common carrier terminal CCT for carrier channel 1, to the common carrier terminals (not shown) of other carrier channels on the power line L and to other central offices (not shown), as indicated.

The line coupling unit CU may comprise a transformer or a transformer-filter arrangement suitable for permitting the transmission of the low voltage, high frequency carrier signals to and from the power line L while substantially preventing transmission of the high voltage, low frequency power from that line into the subscriber or central office carrier terminal equipment.

The central office CO associated with the common carrier terminal CCT of channel 1 provides means for setting up the required connections for central office calls between any of the regular subscriber lines of an associated voice frequency telephone network and any subscriber station associated with carrier channel 1 on line L through that central office CO, the common carrier terminal CCT, coupling unit CU and line 1. Similarly, each of the other central offices provides means for setting up the required connections for central office calls between the regular subscriber lines on other associated telephone networks (not shown) and any of the subscriber stations associated with carrier channel 1 on power line L through that office, the first central office CO, the common carrier terminal CCT, the coupler unit CU and the line L.

A local subscriber's telephone set $SS_{A1}$, which may be of standard type as indicated by the simplified circuit in the box so labeled, is connected by an individual two-wire circuit to the subscriber carrier terminal $SCT_A$; and a long two-wire line extension $LE_A$ serves to connect the other similar telephone sets $SS_{A2}$, $SS_{A3}$, $SS_{A4}$ . . . of other subscribers not served by the power line L but clustered in such a way that they can be reached by individual two-wire line drops, to the same subscriber carrier terminal $SCT_A$. Similarly, as indicated, a number of other similar subscriber telephone sets $SS_{B1}$, $SS_{B2}$ . . . of other clustered subscribers not served by the power line L may be connected by individual two-wire line drops and a common long two-wire line extension $LE_B$ to the nearest subscriber carrier terminal $SCT_B$. As "clustering" is often found in practice, this feature may be used to enable substantial cost savings by reducing the number of subscriber carrier terminal and coupling units as compared to known prior art carrier systems requiring a separate carrier terminal and coupling unit for each station. As indicated, padding resistances R1, R2, R3 . . . of suitable values would be used in the individual two-wire drops to the subscriber telephone sets nearest the subscriber carrier terminal, $SCT_A$ or $SCT_B$, which is served from the two-wire line extension $LE_A$ or $LE_B$, respectively, to equalize the transmissions received by these subscriber sets.

The power needed to operate the central office common carrier terminal CCT and the subscriber carrier terminals $SCT_A$, $SCT_B$ . . ., may be obtained from the power line L, as indicated, by the use of individual step-down transformers T connected between the power line L and each of these terminals, adapted for reducing the high voltage of the electric power received over the line to the desired 110 volts. Supervision is maintained in normal fashion by the central office carrier terminal CCT as far as the central office CO is concerned and is provided through the subscriber carrier terminals $SCT_A$, $SCT_B$ . . . by the use of normal switchhook contacts in the associated subscriber sets $SS_{A1}$, $SS_{A2}$, $SS_{B1}$, $SS_{B2}$ . . .

The channel carrier frequencies used in the system of the invention (Fig. 1) for opposite directions of transmission may be in the same frequency band as now used in the commercial Bell System power line carrier system, known as the M1 carrier system, for example, the transmitting carrier frequency, hereinafter designated as F1, may fall in the frequency band from 155 to 230 kilocycles, and the receiving carrier frequency, hereinafter designated F2, may fall in the frequency band from 290 to 450 kilocycles, although other frequencies may be used.

Figure 4:
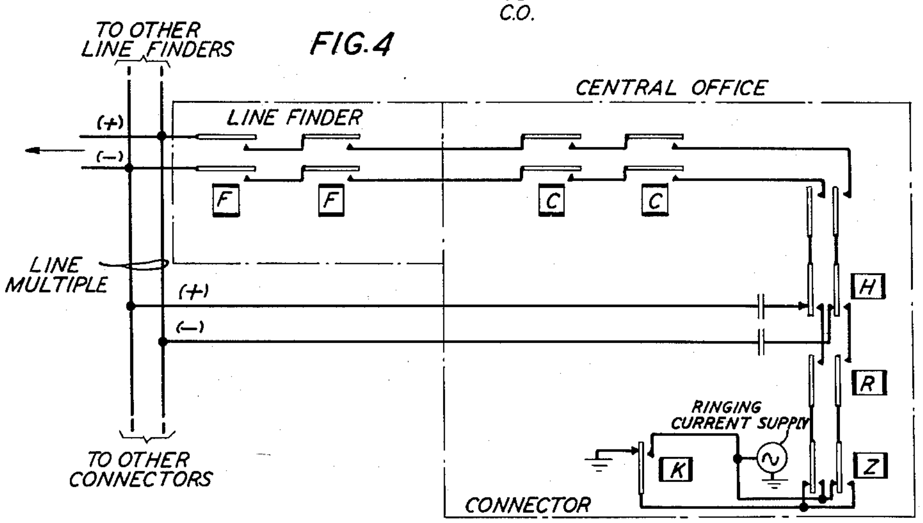
Fig. 4 shows schematically and in part diagrammatically one known type of central office which may be used in the system of Fig. 1.

In the following description of the operation of the system of Fig. 1, it will be assumed that the central office CO will be of a known commercial all-relay type providing simultaneous ringing on both "tip" and "ring" on reverting calls, illustrated in Fig. 4, although other types of dial offices providing revertive ringing on either "tip" or "ring" with the required code, and in addition providing a "guard" ring on the other conductor, may be used. The usual "line finder" and "connector" equipments in the central office of Fig. 4 are illustrated diagrammatically.

As shown in Fig. 2, the common carrier terminal CCT associated with carrier channel 1 on power line L includes a transmitting branch circuit 3 and a receiving branch circuit 4, for transmitting carrier signals to the line and receiving carrier signals from the line, respectively. The output of the transmitting branch circuit 3 and the input of the receiving branch circuit 4 are connected in parallel to the common two-wire circuit 5 connecting through the coupler unit CU to the line L.

The input of the transmitting branch circuit 3 and the output of the receiving branch 4 are connected by a hybrid coil H1 and associated line balancing network N1 in conjugate relation with each other and in energy transmission relation with respect to the two-wire circuit 6 adapted for connection to the "tip" and "ring" conductors 7 and 8, respectively, leading to the central office CO. The transmitting branch circuit 3 includes in order, between the hybrid coil H1 and the circuit 5, the modulator 9, the transmitting amplifier 10 and the transmitting band-pass filter 11. A normally deenergized oscillator 12, which, when energized, is adapted to generate carrier oscillations of the high frequency F2, to be utilized for transmitting voice and ringing signals to the line L, is connected to the carrier input terminals of the modulator 9. The receiving branch circuit 4 includes in order, between circuit 5 and the hybrid coil H1, the receiving band-pass filter 13, the demodulator 14 and the receiving amplifier 15 connected to one output circuit for the demodulator 14. The common carrier terminal CCT also includes the auxiliary amplifier 16 fed from a second output circuit of demodulator 14, a plurality of switching relays 17 to 22 controlled from the output of amplifier 16, and associated batteries and condensers, the functions of which will be described later in connection with a complete description of operation of the entire system.

The modulator 9 in the transmitting branch circuit 3 may be of any suitable unbalanced type including one or more electron discharge tubes or other variable resistance devices, for example, copper oxide rectifiers, adapted for combining high frequency carrier oscillations supplied to its carrier input terminals with the low frequency voice or ringing signals supplied to its signal input terminals, so as to produce signal sideband components as well as a given amount of unmodulated carrier component in its output. The carrier oscillator 12 may be of any of the known vacuum tube types or may be combined with the associated modulator in a single electron discharge tube in conventional manner. The demodulator 14 in the receiving branch circuit 4 also may be of any suitable type adapted to detect low frequency voice or ringing signals from the signal-modulated carrier waves applied to its input circuit; for example, it may comprise a varistor consisting of a plurality of copper oxide or crystal rectifier elements connected in series between the input of amplifier 15 and the output of filter 13.

As shown in the block schematic of Fig. 3, each of the subscriber carrier terminals $SCT_A$, $SCT_B$ . . . includes a modulator 23, similar to the modulator 9 in the circuit of Fig. 2; two demodulators 24 and 25, similar to the demodulator 14 in the circuit of Fig. 2; two normally deenergized oscillators 26 and 27, similar to the oscillator 12 in the circuit of Fig. 2, which, when energized, are adapted to generate carrier oscillations of the frequencies F1 and F2, respectively; two band-pass filters 28 and 29 the pass bands of which are centered at the frequencies F1 and F2, respectively, and are wide enough to pass audio sidebands of these respective frequencies, and a low-pass filter 30 having a cut-off at about 100 cycles; three one-way amplifiers 31, 32 and 33; the hybrid coil H2 and associated line balancing network N2; and the switching relays 34 to 38, inclusive with associated energizing batteries and condensers the functions of which will be described later.

A transmitting talking and signaling path between the two-wire circuit 39 adapted for connection to the subscriber telephone set $SS_{A1}$ and to the subscriber telephone sets $SS_{A2}$, $SS_{A3}$, $SS_{A4}$ . . . over the wire line extension $LE_A$ or to the subscriber telephone sets $SS_{B1}$, $SS_{B2}$ . . . over the wire line extension $LE_B$, and the two-wire circuit 40 connecting through a coupler unit CU to the line L, is normally set up through hybrid coil H2, modulator 23, contacts 1 of unenergized relay 34 and band-pass filter 28. An alternative transmitting talking and signaling path between the two-wire circuits 39 and 40 through hybrid coil H2, modulator 23 and band-pass filter 29 is normally broken at open contact 2 of relay 34. The output of the carrier oscillator (F1) 26 is normally connected across the carrier input terminals of modulator 23 through the normally made contacts 3 of unenergized relay 34, and the connection of the output of the carrier oscillator (F2) 27 across the carrier input terminals of modulator 23 is normally broken at the normally open contacts 4 of relay 34. A talking and signaling receiving path between the two-wire circuits 40 and 39 is normally set up through band-pass filter 29, demodulator 24, normally made relay contacts 8 and 10 of relay 34 and hybrid coil H2. An alternative receiving talking and signaling path between circuits 40 and 39 through band-pass filter 28, demodulator 25 and hybrid coil H2 is normally broken at the normally open contacts 7 and 9 of relay 34. The hybrid coil H2 and associated line balancing network N2 serve to provide conjugacy between the transmitting and receiving talking and signaling paths set up at any time, while allowing transmission between each of these paths and the two-wire circuit 39.

A second output for demodulator 24 is connected to the switching relay 36 over a path including contacts 1 of the relay 35, amplifier 31, the operating winding of relay 36 and battery 41. A third output of demodulator 24 is provided to operate the ringing relay 38 over a path including the low-pass filter 30, amplifier 32, contacts 2 of relay 35, the operating winding of relay 38 and battery 42.

The manner in which the equipments of the common carrier terminal and the subscriber carrier terminals described above cooperate with the central office for different types of calls in the system of Fig. 1 will now be described.

*Call from subscriber in regular telephone plant to carrier subscriber on power line*

Suppose a subscriber located in a regular voice frequency telephone network associated with the central office desires to communicate with another telephone subscriber associated with the power line carrier system, say at station $SS_{A1}$. The calling subscriber rings the central office CO in the usual manner and transmits to the central office the number to be called including the ringing code assigned to station $SS_{A1}$. The central office CO will then function in well-known manner to send out to the common carrier terminal CCT 20-cycle ringing current coded in accordance with the number to be called. The coded 20-cycle ringing current may be applied either to the tip conductor 7 or the ring conductor 8 at the common carrier terminal CCT. It will be assumed for the purposes of this description that tip ringing is being used. In this case the relay 20, which is an alternating-current relay, will be operated over a path extending from conductor 7 through contacts 4 on relay 18, condenser 42 and the winding of relay 20 to ground. Relay 20 on operating closes its contacts 1 and 2. Contacts 2 have no function for this type of call, but the closing of contacts 1 will cause ground to be applied to conductor 43 which through the normally closed contacts 1 of relay 22 closes an energizing circuit for oscillator 12 so that the latter will supply carrier oscillations of the frequency F2 to the carrier input terminals of modulator 9. The received coded 20-cycle ringing current will be applied to the signal input terminals of the modulator 9 over a path extending from conductor 7 through closed contacts 4 on relay 18, condenser 44 and conductor 45, and will be combined in the modulator 9 with the applied carrier oscillations of frequency F2. The resulting ringing signal-modulated and unmodulated carrier waves of frequency F2 appearing in the output of modulator 9 will be amplified by amplifier 10 and then passed through filter 11 in the output of the transmitting branch circuit 3 to the two-wire circuit 5 from which they will be applied to the power line L through a coupler unit CU.

A different energy portion of the transmitted signal-modulated and unmodulated carrier waves will be diverted from the power line L through a coupler unit CU and two-wire circuit into each of the subscriber carrier terminals $SCT_A$, $SCT_B$ . . . in which it will be selectively transmitted through the band-pass filter 29 and demodulated in the following demodulator 24. One portion of the demodulated output of the demodulator 24 will pass over the normal receiving talking path to the hybrid coil H2. Another portion will be impressed on the 100-cycle cut-off low-pass filter 30 which will suppress any voice frequency signal components but will pass the 20-cycle ringing signals. The latter signals will be amplified sufficiently in amplifier 32 to cause operation of the ringing relay 38 connected to its output over a path previously traced. Relay 38 is designed so that it will operate and release on each cycle of the applied 20-cycle ringing current. The actual ringing current supplied to the subscriber's wire line extension is provided by direct current from battery 46 which is applied through capacitors 47 and 48 and closed contacts 2 and 3 of relay 38 to the two sides of the wire line extension $LE_A$ or $LE_B$ each time the ringing relay 38 operates. The ringer 49 in each of the subscriber sets $SS_{A1}$, $SS_{A2}$, $SS_{A3}$ . . . connected to the line extension $LE_A$ or $SS_{B1}$, $SS_{B2}$ . . . connected to the line extension $LE_B$ will be operated by the coded ringing thus applied.

The called power line subscriber, for example, the one associated with subscriber set $SS_{A1}$ recognizing his coded ring answers by removing his receiver 50 from the switchhook 51 closing an energizing circuit for the operating winding of relay 35 from battery 52. The resulting operation of relay 35 closes a talking path to his transmitter 53 and receiver 50 through contacts 1 and 4 of relay 38, contacts 1 on relay 37 and contacts 4 and 5 on relay 35 to the line windings of hybrid coil H2. It will be noted that relay 36 has also operated due to the presence of the carrier frequency F2 on the line L, over a path to that relay extending from the output of demodulator 24 through contacts 1 of relay 35, amplifier 31, operating winding of relay 36, battery 41 and ground back to the output of demodulator 24. The operation of relay 36 has no function at this time. Relay 35 operated in the manner previously described in response to the called subscriber answering his coded ring, in addition to closing a talking path from the subscriber's telephone set, applies a holding ground for relay 36 over a path which may be traced from ground through contacts 7 on relay 35 and contacts 2 on relay 36 to the winding of relay 36. Operated relay 35 also applies a ground over a path through contacts 6 on relay 35 to the oscillators 26 and 27 which causes their energization. The operation of relay 35 also breaks the normal operating paths for relays 36 and 37. The opening of contacts 3 on relay 35 breaks the operate path of the transfer relay 34. It will be noted that the output of the carrier oscillator 26 is connected through contacts 3 of relay 34 to the modulator 23 to provide the carrier wave of frequency F1 for the called subscriber's talking currents. At this point relays 35 and 36 are operated and all other relays in the subscriber carrier terminal $SCT_A$ are in the normal condition shown so that the terminal is in proper condition for transmitting and receiving.

The carrier component of frequency F1 appearing in the output of modulator 23 when the called subscriber answered will be transmitted through the filter 28, the two-wire circuit 40 and a coupler unit CU to the power line L and over that line to the common carrier terminal CCT where it will be diverted through another coupler unit CU and the two-wire circuit 5 into the receiving branch circuit 4 of that terminal, in which it will be selected by the receiving band-pass filter 13 and detected by the demodulator 14. The resulting output of demodulator 14 will cause the operation of the relay 17 over a path extending from the demodulator output through amplifier 16 and the operating winding of relay 17 to battery 53. Relay 17 in operating closes an operating circuit for relay 18 over a path extending from ground through contacts 3 on relay 17, operating winding of relay 18 and battery 54 to ground. The resultant operation of relay 18 will cause the tip conductor 7 and the ring conductor 8 to be extended through to the hybrid coil H1, the tip conductor 7 through contacts 5 of relay 18 to one side of the line windings of that coil and the ring conductor 8 through contacts 6 on relay 18 and contacts 2 on relay 17 to the other side of the line winding of that coil. The closing of contacts 2 on relay 17 by operation of that relay has no function for this type of operation. The bridge applied to the tip and ring conductors 7 and 8 over the path traced above by the operation of relays 17 and 18 results in the operation of a tripping and supervisory relay (not shown) in the associated central office CO to stop the transmission of the coded 20-cycle ringing current from that office.

The conditions of the equipments in the subscriber carrier terminal $SCT_A$ and the common carrier terminal CCT are now such that the calling subscriber in the telephone plant and the called carrier subscriber ($SS_{A1}$) may carry on a conversation. The calling subscriber talks over a path extending through the central office CO to the tip and ring conductors 7 and 8 of the common carrier terminal CCT and through contacts 5 and 6 on relay 18, contacts 2 on relay 17, hybrid coil H1, modulator 9, amplifier 10, band-pass filter 11, and thence through two-wire circuit 5, a line coupler CU to the power line L, the calling subscriber's speech being transmitted at voice frequencies up to the input of modulator 9 and being in the form of voice-modulated carrier of frequency F2 from the output of modulator 9 on. At the subscriber carrier terminal $SCT_A$, the voice-modulated carrier of frequency F2 is diverted from the power line L through a coupler device CU and the two-wire circuit 40 to the receiving talking path of that terminal in which it will be selected by band-pass filter 29 and demodulated in demodulator 24. The demodulated speech of the calling subscriber passes from the output of demodulator 24 through contacts 8 and 10 of transfer relay 34, hybrid coil H2, two-wire circuit 39, contacts 4 and 5 of relay 35, contact 1 of relay 37, contacts 1 and 4 of relay 38 and the wire line extension $LE_A$ to the called subscriber's receiver 50 in the telephone set $SS_{A1}$.

The talking path for the called subscriber is from the subscriber line through contacts 1 and 4 of relay 38, contacts 1 of relay 37, contacts 4 and 5 of relay 35, circuit 39, hybrid coil H2, modulator 23, contacts 1 of relay 34, filter 28, two-wire circuit 40 and coupler unit CU to the power line L where his speech is in the form of voice-modulated carrier of frequency F1. At the common carrier terminal CCT, the voice-modulated carrier of frequency F1 is diverted from the power line L through a coupler unit CU and two-wire circuit 5 into the receiving branch circuit 4 in which it is selected by filter 13 and demodulated to voice frequencies in demodulator 14. The called subscriber's speech signals in the output of demodulator 14 are amplified by amplifier 15 and passed through the hybrid coil H1 to the two-wire circuit 6 from which they will pass through contacts 2 of relay 17, contacts 6 and 5 of relay 8, the tip and ring conductors 7 and 8 to the central office CO and through that office to the calling subscriber's line. A continuous direct-current supervisory path is provided to the central office line between tip and ring by the common carrier terminal CCT from tip conductor 7 through contacts 5 on relay 18, one line winding of hybrid coil H1, balancing network N2, contacts 2 on relay 17, and contacts 4 on relay 18 to ring conductor 8, which is the normal condition on a line as provided by a normal subscriber set. It may be seen that called subscriber switchook supervision is thus maintained by the presence of the carrier frequency F1 on the power line L, relay 16 being maintained operated by the incoming frequency F1 transmitted through filter 13, demodulator 14 and amplifier 16, which, in turn, holds the supervisory or cut-through relay 18 operated through operated contacts 3 of relay 17.

At the end of the conversation, when the called subscriber hangs up his receiver 50 on switchhook 51, relay 35 in the subscriber carrier terminal $SCT_A$ will release thus removing energizing current from the oscillator 26 so as to remove the carrier frequency F2 from the power line L. All other relays in this terminal and the common carrier terminal CCT will be restored to their normally unoperated conditions.

*Call from a power line carrier subscriber to a subscriber in regular telephone plant*

The second case to be described is that of a calling subscriber located in a rural area served by the power line carrier system originating a call to another subscriber in a voice frequency telephone network associated with the central office CO. When the calling subscriber, for example, the subscriber associated with subscriber telephone set $SS_{B1}$, takes his receiver 50 off the switchhook 51, an energizing circuit from battery 52 is closed for the operating windings of line relay 35 through normally closed contacts on relay 38. Relay 35 will then operate to close the talking path from the subscriber set $SS_{B1}$ through the hybrid coil H2 to the modulator 23 and performs such other functions, as described previously in connection with a call originated by a subscriber in the telephone plant, necessary to apply the carrier wave of frequency F1 to the power line L over a path extending from the output of the carrier oscillator 26 through contacts 1 on transfer relay 34, filter 28, two-wire circuit 40 and coupler unit CU to the power line L.

The operation of the carrier terminal CCT for this particular type of call is determined by its ability to recognize that a carrier wave of the frequency F1 is present on the power line L indicating that a power line carrier subscriber has caused operation of equipment in the associated subscriber carrier terminal, in this case, $SCT_B$, to apply the frequency F1 to the power line. A portion of the energy of the carrier wave of frequency F1 is diverted from the line L through a coupler unit CU and two-wire circuit 5 into the receiving branch circuit 4 of the common carrier terminal CCT in which it is selected by the band-pass filter 13 and detected by the demodulator 14 causing operation of the relay 17 connected to the output of the latter through amplifier 16. The relay 17 having operated in turn operates relay 18 over a path extending from ground through contacts 3 on relay 17, operating winding of relay 18 and battery 54 to ground. As described previously, the operation of relays 17 and 18 results in a direct-current bridge on the tip and ring conductors 7 and 8 leading to the central office CO indicating at that office that a carrier subscriber on the line L wishes to originate a call. The central office CO after performing its normal switching function to connect the called subscriber line in the telephone plant to the line leading to the common carrier terminal CCT, returns dial tone to that terminal. The line relay 18 in the common carrier terminal CCT on operating in response to the carrier wave of frequency F1 on the line L as previously described had turned on the oscillator 12 generating carrier oscillations of the frequency F2, by applying ground thereto over a path extending through contacts 1 on relay 18, contacts 1 on relay 22 and conductor 43. The dial tone is applied to the signal input terminals of modulator 9 over the path from the central office CO through contacts 5 and 6 on relay 18, contact 2 on relay 17, circuit 6 and hybrid coil H1, and is combined in the modulator with the carrier oscillations of frequency F2 supplied to the carrier input terminals of modulator 9 by oscillator 12. The dial tone-modulated carrier in the output of modulator 9 is supplied through amplifier 10, filter 11, two-wire circuit 5 and a coupler unit CU to the power line L and from thence is sent back to the calling subscriber over a previously traced transmission path through the subscriber carrier terminal $SCT_B$. The calling subscriber on receiving the dial tone in his receiver 50 commences dialing on his dial 55 the called subscriber's directory number the result of which is to send pulse-modulated carrier of frequency F1 out over the power line L. This pulse-modulated carrier is diverted from the power line L through a coupler unit CU and two-wire circuit 5 into the receiving branch 4 of the common carrier terminal CCT in which it is selected by the filter 13, and is then demodulated in the demodulator 14. The presence of the dialing pulses is recognized by the common carrier terminal by the pulsations of the frequency F1 in the output of demodulator 14. As a result of this, the relay 17 connected to the output of demodulator 14 through amplifier 16 releases and reoperates on each dial pulse. By making the relay 18 slow to release, relay 17 will make and break the direct-current path to the central office CO previously described and in effect send normal direct-current pulses into the central office CO. After dial pulsing has been completed, the equipment in the common carrier terminal CCT is in such condition as to provide two-way transmission for conversation. At this point, the calling subscriber's carrier terminal $SCT_B$ is sending out the carrier frequency F1 to the power line and the common carrier terminal is transmitting the carrier frequency F2 to the power line. The transmission paths are now the same as in the preceding case as regards supervision over the connection.

*Provision for secrecy and guard against signaling interference*

The function of the relays 36 and 37 in each subscriber carrier terminal $SCT_A$, $SCT_B$ . . . is that of monitoring to determine what frequencies are on the power line L at any time. It is seen that if both frequencies F1 and F2 are present on the power line as is the case of the types of calls previously described, both relays 37 and 36, respectively, will be operated over the respective paths previously described. In the case of the power line carrier system being in use for transmitting a call between two subscribers when another subscriber attempts to originate a call, the latter will not be able to operate the line relay 35 in his associated subscriber carrier terminal $SCT_A$, $SCT_B$ . . ., due to the fact that the operate path of that relay is opened by contacts 2 on relay 37 and the operate path of the transfer relay 34 is opened by contacts 1 on relay 36. Thus, the subscriber who finds the line L busy on a call when he attempts to originate a call will not be in a position to listen to the conversation going on nor will his subscriber carrier terminal be able to apply any additional carrier signals from the oscillators at his terminal to the power line. It should be noted that if two subscriber carrier terminals, say $SCT_A$ and $SCT_B$ should apply the carrier frequency F1 to the line L at the same time, there will be interference due to heterodyning of the two frequencies which would result in an undesirable tone in the receivers of the other subscribers. It is evident, therefore, that the use of the monitoring relays 36 and 37 provides an improvement in the degree of secrecy of conversations over the system, and prevents undesirable heterodyning and signaling interference during dialing by not allowing another carrier terminal to be connected to a busy line.

*Reverting call between two subscribers associated with different subscriber carrier terminals*

The calling subscriber starts this type of call just as if he were calling another subscriber in the voice frequency telephone plant associated with the central office CO, that is, by dialing the directory number of the called subscriber. The resulting operation at the carrier subscriber terminal of the calling subscriber and the common carrier terminal CCT are the same as for the second case described above. The central office CO then returns a busy tone over the previously described transmission path and the calling subscriber then hangs up his receiver 50 which causes the central office equipment to start revertive ringing because of the release of the relays 17 and 18 at the common carrier terminal CCT with cessation in the supply of the carrier wave of frequency F1 over the line L.

With the particular type of central office assumed, revertive ringing by the central office CO is indicated by the fact that the 20-cycle ringing frequency is applied to both the tip and ring conductors 7 and 8 at the common carrier terminal CCT in parallel to ground. This will produce operation of both of the associated relays 19 and 20 thus causing relay 21 to operate over a path from ground through contacts 2 on relay 19 and contacts 2 on relay 20 through the winding of relay 21 to battery 56. Relay 21 is a memory relay which indicates by its operation that revertive ringing has been in progress. Oscillator 12 is energized in response to operation of the relay 18 in the manner described previously, to supply carrier wave of the frequency F2 to modulator 9, and the carrier wave of frequency F2 modulated with the coded 20-cycle ringing information supplied to the signal input terminals of the modulator through hybrid coil H1, will be transmitted out over the power line L in the manner previously described.

The demodulated coded 20-cycle ringing information received through the hybrid coil H2 from the output of the demodulators 24 in the subscriber carrier terminals associated with the calling and called subscriber stations will cause the ringers 49 at these stations to be rung with the calling subscriber's code at the regular machine ringing intervals. The called subscriber by lifting his receiver 50 will cause a carrier wave of the frequency F1 to be sent out to the power line L in the manner previously described. The operation of the relays 17 and 18 at the common carrier terminal CCT in response to the received carrier wave of frequency F1 will cause, in the manner previously described, a bridge to be applied to the conductors 7 and 8 leading to the central office CO which in turn will cause the operation of a tripping and supervisory relay in the central office CO to trip the machine ringing. The receipt of the carrier frequency F1 at the common carrier terminal CCT after revertive ringing has been started indicates to that terminal that the supply of carrier frequency F2 to the power line L should be shut off. The relay 22 will be operated in response to operation of the relay 17 over a path extending from ground through contacts 1 on relay 17, contacts 1 on relay 21, the winding of relay 22 and battery 57 to ground.

Relay 22 after it is operated locks up to ground over a path from its winding through contacts 2 on that relay and contacts 2 on relay 18 to ground. The operation of relay 22 will cause the oscillator 12 to be shut off by opening its contacts 1. The common carrier terminal CCT now has only one function, as the call is between two carrier subscribers on the same power line L, and that is to hold the line 7, 8 closed to the central office CO to indicate to that office that the power line L is busy. This, of course, is accomplished by relay 17 remaining operated due to the presence of F1 on the power line L. The calling subscriber recognizing that ringing has stopped, indicating that the called subscriber has answered, again lifts his receiver 50 off the switchhook 51. At this time, it will be noted that only the relay 37 in the carrier terminal of the called subscriber is operated as a consequence of only the carrier frequency F1 being present on the power line L, so that the called subscriber when he answers will operate the transfer relay 34 in his carrier terminal unit, instead of operating relay 35 directly, over a path from one side of the wire line extension $LE_A$ or $LE_W$, through operated contacts 2 on relay 37, contacts 1 on relay 36, contacts 3 on relay 35, the winding of relay 34 and battery 58. The subscriber wire line extension is now a closed loop due to the calling subscriber having picked up his receiver 50 and relay 34 will be operated in series with one of the windings on relay 35. The winding of the transfer relay 34 should be so designed that it will have a high resistance so that this relay will operate on a current which will not cause relay 35 to operate. Relay 34 on operating will cause relay 35 to operate by closing a bridged path through contacts 5 on relay 34 across contacts 1 on relay 37 which was initially operated and prevented the calling subscriber from operating the relay 35 directly. Relay 35 on operating will close a holding path for relay 34 over a path from ground through contacts 7 on relay 35, contacts 6 on relay 34 to its winding. Relay 34 on operating will also connect hybrid coil H2 to demodulator 25 in place of demodulator 24, through contacts 7 and 9. It will also connect oscillator 27 instead of oscillator 26, to modulator 23 through contacts 4. The relay 34 also connects the output of modulator 23 to the filter 29 instead of filter 28, through contacts 2. It was pointed out that relay 35 by operating turned on both oscillators 26 and 27; however, the correct oscillator to be used is selected by the condition of relay 34. It will be remembered that the called subscriber whose carrier terminal operates in normal fashion, transmits the carrier frequency F1 and receives the carrier frequency F2. However, the carrier terminal of the calling subscriber in the manner described has had its transmitting and receiving frequencies transposed so that it will transmit on frequency F2 and receive on frequency F1. It is this condition which allows the two carrier subscribers to carry on a two-way conversation over the same power line on just two frequencies. The operation during the reverting call is carried on automatically by the arrangement of apparatus provided in the subscriber and common carrier terminals. This allows the power line carrier subscribers to use normal station equipment without any necessity for provision of additional keys, signaling devices or signal lamps to control such conditions.

*Reverting call between two subscribers on same wire line extension*

A second type of reverting call would be that between two power line subscribers on the same wire line extension utilizing only one subscriber carrier terminal. The same procedure as in the first type of reverting call would be used, except that relay 34 in the subscriber carrier terminal will not be operated because its associated relay, relay 35, operates first to close the talking path and perform the other functions previously described to send out the carrier frequency F1 over the power line L to the common carrier terminal CCT where it will be detected and causes continuous operation of the relays 17 and 18 to close the line to the central office CO, thus operating the busy signal in that office. The common carrier terminal proceeds in the manner previously described to operate relay 22 which breaks the energizing circuit for oscillator 12 so as to remove the carrier frequency F2 from the power line, not made use of in this type of call as the transmission between the two subscribers involved in the call will be carried on entirely on a voice frequency basis over the metallic paths of the subscriber wire line extensions, transmission battery for both telephone sets involved in the call being furnished from the same source.

If another type of dial central office employing a different type of revertive ringing consisting of ringing on either tip or ring conductor with the required code, and in addition providing a guard ring on the other conductor, is used with the system of the invention, the relay 19 or 20 would operate on this guard ring in the same manner as if it were a regular ringing code.

In practice, it may be advisable to add a padding resistance of suitable value to all subscriber telephone sets on a wire line extension except the one most remote from the associated subscriber carrier terminal, or that no matter which subscriber on the wire line extension lifts his receiver, the line will have approximately the same resistance in all cases as far as the operation of the line relay (35) and matching of the hybrid coil H2 by the balancing network N2 are concerned.

In the above description of the system of the invention, it is assumed that "bridged ringing" is employed, that is, the type in which all subscribers on the power line are rung simultaneously. However, it is understood that other well-known phase discrimination methods to provide "divided code ringing" may be employed. Other modifications of the system illustrated and described which are within the spirit and scope of the invention will occur to persons skilled in the art.

What is claimed is:

1. In a carrier telephone system which comprises a carrier wave transmission medium, a common carrier terminal coupled to said medium at one point thereof, and a plurality of subscriber carrier terminals coupled to said medium at respectively different points thereof, said subscriber terminals forming with said common terminal a single two-way carrier channel in which first and second separate and distinct carrier frequencies are used for receiving and transmitting, respectively, at said common terminal and for transmitting and receiving, respectively, at said subscriber terminals: testing means at each of said subscriber terminals to detect continually the presence of said first and second carrier frequencies on said medium, circuit means at each of said subscriber terminals under the control of said testing means to connect the said terminal to transmit said first carrier frequency and to receive said second carrier frequency when said first carrier frequency is absent from said medium, circuit means at each of said subscriber terminals under the control of said testing means to connect the said terminal to transmit said second carrier frequency and to receive said first carrier frequency when only said first carrier frequency is detected on said medium, and circuit means at each of said subscriber terminals under the control of said testing means to prevent the said terminal from transmitting or receiving either of said carrier frequencies when both are detected on said medium, whereby both non-reverting calls between one of said subscriber terminals and said common terminal and reverting calls between two of said subscriber terminals are automatically accommodated with only said two different carrier frequencies and lock-out protection is provided to isolate the inactive subscriber terminals from said medium while said medium is in use.

2. In a carrier telephone system in accordance with claim 1, circuit means at said common terminal to distinguish between reverting calls on said medium between two of said subscriber terminals and non-reverting calls on said medium between one of said subscriber terminals and said common terminal, and circuit means responsive to said distinguishing means to prevent said common terminal from transmitting said first carrier frequency during a reverting call.

References Cited in the file of this patent

UNITED STATES PATENTS

| | | |
|---|---|---|
| 2,107,168 | Tedd | Feb. 1, 1938 |
| 2,408,085 | Meacham | Sept. 24, 1946 |
| 2,440,239 | Almquist | Apr. 27, 1948 |
| 2,510,273 | Barstow et al. | June 6, 1950 |